(12) United States Patent
Chaudhry et al.

(10) Patent No.: US 10,341,702 B1
(45) Date of Patent: Jul. 2, 2019

(54) METHOD AND SYSTEM FOR PROVIDING DIFFERENT CATEGORIES OF PROGRAMMING DATA TO A USER DEVICE FROM HEAD END SYSTEMS

(75) Inventors: Kapil Chaudhry, Cerritos, CA (US); Jin H. Chung, Fullerton, CA (US); Gideon S. Raj, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 516 days.

(21) Appl. No.: 13/028,150

(22) Filed: Feb. 15, 2011

(51) Int. Cl.
*H04N 5/445* (2011.01)
*H04N 21/2543* (2011.01)

(52) U.S. Cl.
CPC .................. *H04N 21/2543* (2013.01); *H04N 2005/44556* (2013.01)

(58) Field of Classification Search
USPC ..................................................... 725/37–61
See application file for complete search history.

(56) References Cited

U.S. PATENT DOCUMENTS

| | | | |
|---|---|---|---|
| 2002/0174430 A1* | 11/2002 | Ellis et al. ....................... | 725/46 |
| 2003/0131355 A1* | 7/2003 | Berenson et al. ............... | 725/46 |
| 2005/0102634 A1* | 5/2005 | Sloo ..................... | G06F 3/0482 |
| | | | 715/823 |
| 2006/0041903 A1* | 2/2006 | Kahn et al. ..................... | 725/28 |
| 2006/0130098 A1* | 6/2006 | Rao et al. ....................... | 725/53 |
| 2006/0248553 A1* | 11/2006 | Mikkelson et al. ........... | 725/23 |
| 2006/0282852 A1* | 12/2006 | Purpura et al. ................ | 725/39 |
| 2007/0250844 A1* | 10/2007 | Collacott .......................... | 725/8 |
| 2007/0261078 A1* | 11/2007 | Hwang .................. | H04H 60/27 |
| | | | 725/49 |

* cited by examiner

*Primary Examiner* — Michael R Telan
(74) *Attorney, Agent, or Firm* — Harness, Dickey & Pierce, P.L.C.

(57) ABSTRACT

A system and method for providing programming data includes a first module that generates first programming data for content and a second module generating billing data corresponding to the content. A listing service module receives first programming data from the first module and receives billing data from the second module. The listing service module combines the first programming data and the billing data to form combined programming data. A first cache module is in communication with the listing service module and a user device and stores the combined programming data.

30 Claims, 15 Drawing Sheets

METHOD AND SYSTEM FOR PROVIDING DIFFERENT CATEGORIES OF PROGRAMMING DATA TO A USER DEVICE FROM HEAD END SYSTEMS

TECHNICAL FIELD

The present disclosure relates to a content processing and delivery system and, more specifically, to a method and system for providing program guide data from different modules capable of being displayed in a content-specific format.

BACKGROUND

The statements in this section merely provide background information related to the present disclosure and may not constitute prior art.

Satellite television is increasing in popularity due to the ever-increasing amount of programming as well as the quality of programming. Impulse pay-per-view occurs when a customer selects to purchase content directly from the user device, such as a set top box, in response to a menu or other prompt. The program is authorized for viewing by the set-top-box, and the impulse pay-per-view selection is communicated from the set-top-box to a billing system for billing the customer the appropriate amount. Another type of pay-per-view system is order-ahead pay-per-view. Order-ahead pay-per-view occurs when a customer selects to purchase using a customer-service agent, a website, a web-based cell phone, or interactive voice menu system. The order-ahead pay-per-view selection is communicated to the billing system for billing the customer the appropriate amount, and the viewing authorization is communicated to the set-top-box. Both impulse pay-per-view and order-ahead pay-per-view may be provided in a single system.

The service provider may communicate real-time content to all users at a specific scheduled time for live viewing or for recording by a DVR for later viewing. This is referred to as linear content. The service provider may also communicate non-real-time content that is faster or slower than normal program viewing. Such transmission is not intended for live viewing but is only intended for recording by a DVR for later viewing. This is referred to as non-linear content. The non-linear content may be provided at different rates and at different times as well. A pre-set broadcast schedule is not published, but the non-linear content may be recorded when a customer selects to record the content from a published list of available programs. This selection may be made from a user device, such as a set top box, or from a website or a web-based cell phone. Non-linear content may also be recorded to the DVR by the service-provider without prior user request. Non-linear content may also be recorded on-demand over the internet.

Linear content may be purchased by IPPV or OPPV for live viewing at the scheduled broadcast time. Linear and non-linear content may purchased by IPPV or OPPV for viewing recorded content.

When providing program information to users, a program guide is typically used. The program guide is a grid guide that lists various content that is available for viewing or for recording to a digital video recorder. A program guide includes a listing of channels and various programming at various times. As broadcasting systems increase the amount of content available, the program guide becomes somewhat cumbersome to manage. Often times, multiple channels provide the same content for viewing. Thus, it may be desirable to provide programming content without as much repetition as previous systems.

Broadcasting systems also provide programming information for all channels that is available to all users. The programming content is not available to certain subscribers based upon a subscription service. Such information takes up space and increases the time for a user to access data. Therefore, it would also be desirable to tailor the content available to a particular user.

SUMMARY

The present disclosure provides a system and method for providing available content to a user device in a format tailored to the user and which reduces repetition.

In one aspect of the disclosure, a method includes receiving first programming data from a first module for content at a listing service module, receiving billing data from a second module for the content at the listing service module, combining the first programming data and the billing data in the listing service module to form combined programming data, and storing the combined programming data in a first cache module accessible from a user device.

In another aspect of the disclosure, a system for providing programming data includes a first module generating first programming data for content and a second module generating billing data corresponding to the content. A listing service module receives first programming data from the first module and receives billing data from the second module. The listing service module combines the first programming data and the billing data to form combined programming data. A first cache module is in communication with the listing service module and a user device and stores the combined programming data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
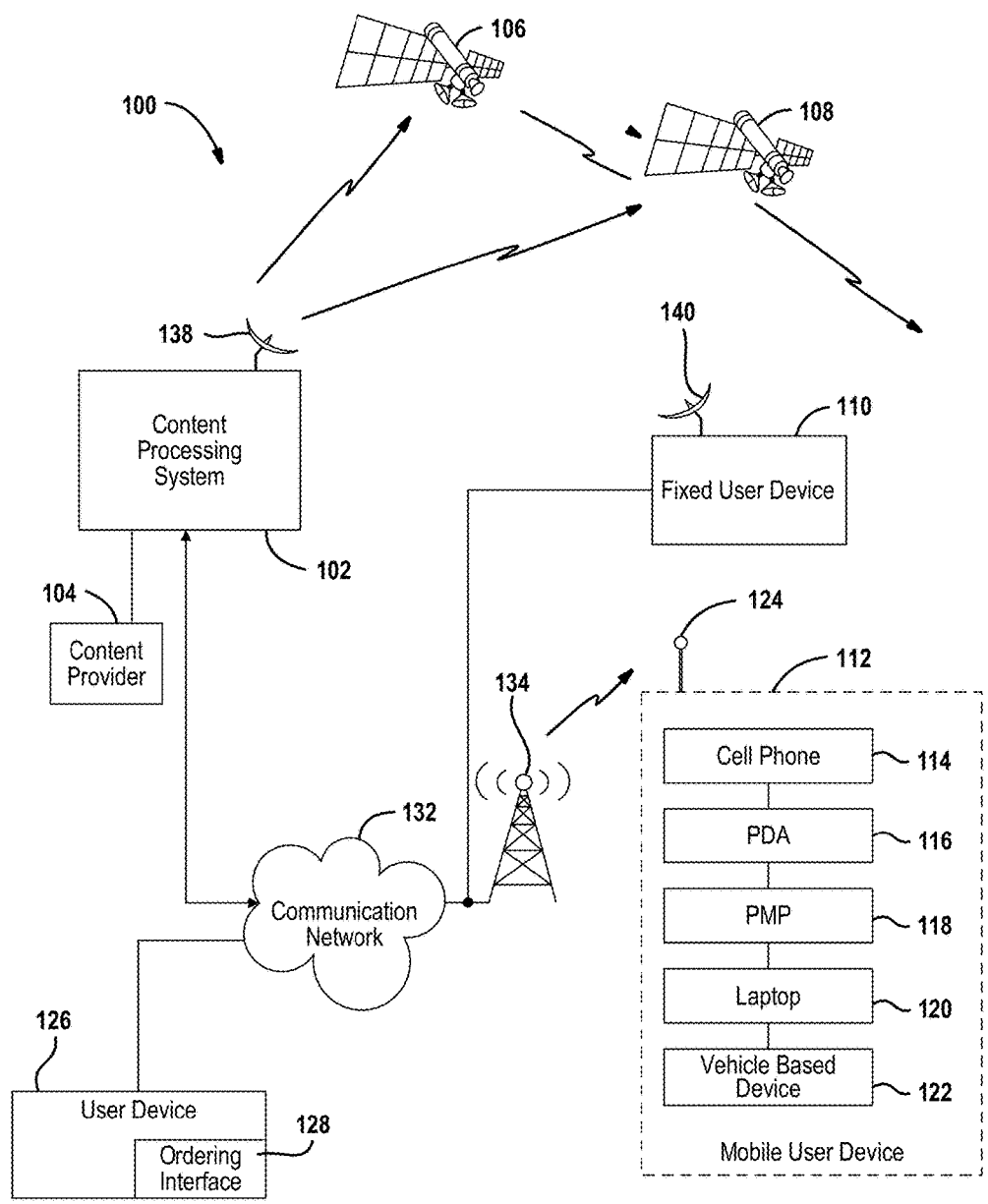
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs) or receiver. Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124. Both the fixed user device 110 and mobile user device 112 may be used as a receiver for receiving content from the satellites 106, 108.

A separate user device 126 may be used for ordering content using an ordering interface 128. Details of the interaction of the user device 126 and ordering interface 128 will be described below. The user device 126 may be one of the devices 114-122.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellites 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers impulse and order-ahead pay-per-view (PPV) program services and broadband services, including billing and associated decryption of video programs. Non-PPV (e.g. free or subscription) or linear programming may also be received. A carousel of multiple program materials may be scheduled within the content processing system 102 whereby the satellites 106, 108 may be used to communicate metadata and content to the user devices 110, 112. To receive the information rebroadcast by satellites 106, 108, each user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset or content the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
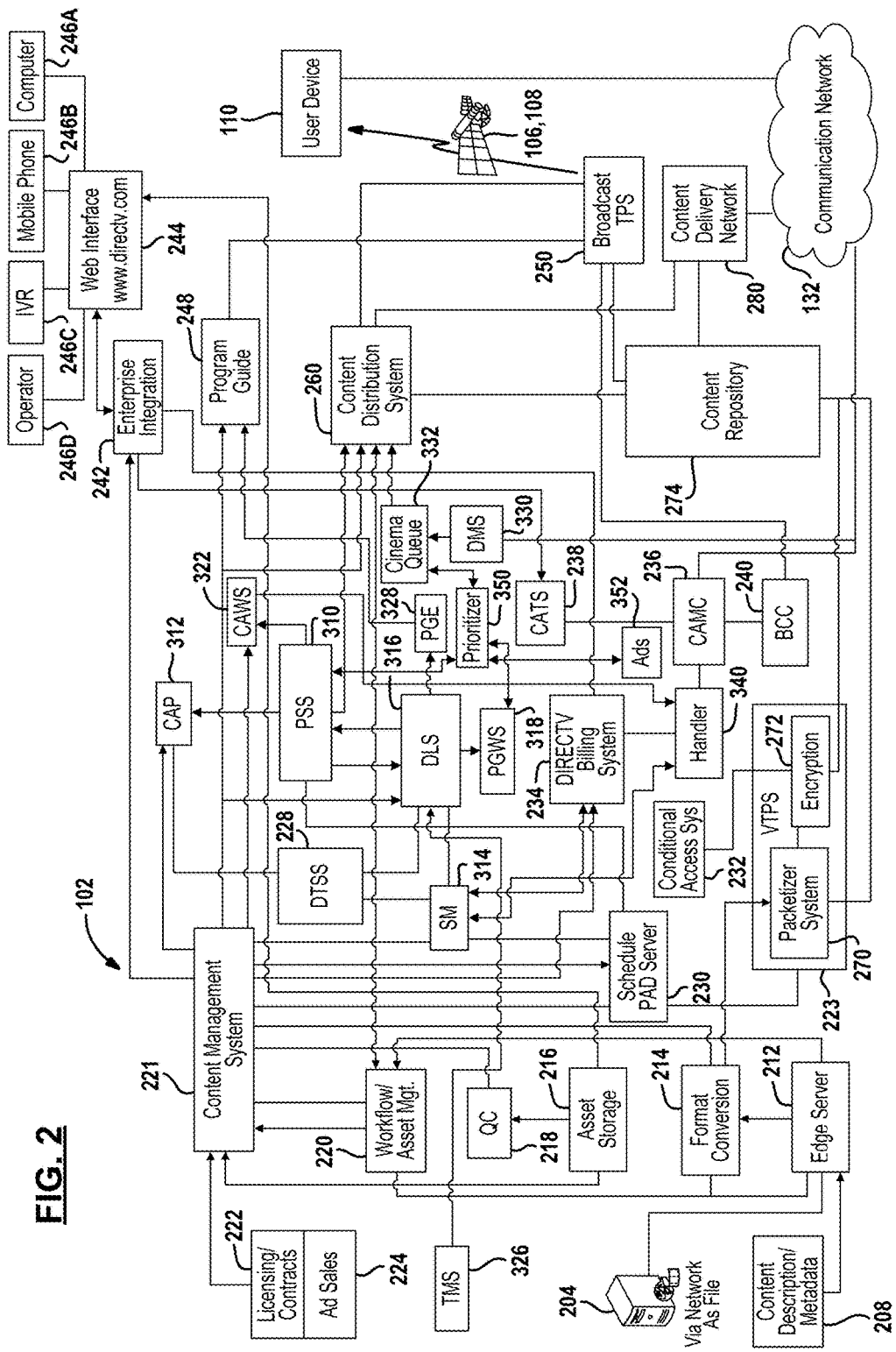
FIG. 2 is a detailed block diagrammatic view of the content processing system of FIG. 1.

Referring now to FIG. 2, the content processing system 102 of FIG. 1 is illustrated in further detail. The content processing system 102 may also be referred to as a head end. The content provider 104 may include various types of content providers, including those that provide content via a network as a file in 204, or by way of a satellite, or by way of recorded media such as DVD, tapes and other means. The content provider 104 may also provide a content description and other metadata 208 to the system. An input server 212 such as an edge server may receive the various content and associated metadata and convert the format in a format conversion system 214. A house format asset storage server 216 may be used to store the content asset in a house format. Still image files, trailers, and other information may also be stored in the house format asset storage server. A quality control system 218 may monitor files for quality and completeness.

A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The content management system 221 may also receive file properties from the quality control system 218. The content management system 221 may have content categories for the content. The categories may correspond to a genre such as horror, romantic, comedy, etc.

The video transport processing system (VTPS) 223 may encode the packets containing the content. The encoder may encode the data into various transport formats such as DIRECTV® proprietary formats, or industry standard formats. The encoded data is then packetized into a stream of data packets by a packetizer 270 that creates pre-packetized unencrypted files. The packetizer 270 also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

An encryption module 272 receives the output of the packetizer system 223 and encrypts the packets. The stream of data packets (i.e., a bitstream) is then broadcast encrypted by, for example, the well-known advanced encryption standard (AES) or the well-known data encryption standard (DES). In an example, only the payload portion of the data packets are encrypted thereby allowing a user device 110 to filter, route and/or sort received broadcast encrypted data packets without having to first decrypt the encrypted data packets. Fully packaged and encrypted files may also be stored in the content repository 274. Encryption may take place in the data portion of a packet and not the header portion.

The content management system (CMS) 221 generally controls the overall movement and distribution of content through the content processing system 102. The CMS 221 may be used to determine which content delivery network is to be used by generating a content delivery network identification. This will be described further below.

Licensing and contract information 222 and advertisements (ads) from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A schedule PAD server (SPS) 230 may be coupled to the content management system (CMS) 221. The CMS 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

The schedule PAD server (SPS) 230 may be used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or according to asset downloads or viewings (e.g., pay-per-view TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed. The billing system 234 records that a user has been authorized to view a movie once an unlocking signal is received, and the user is billed for the movie. The billing system may receive an unlocking signal comprising a purchase request from the user. In this example the user may order the movie by way of a computer 246A connecting to a website, a mobile phone 246B, an interactive voice system 246C and by a phone call to an operator 246D. The billing system 234 may bill the user account and send or authorize the sending of an authorization signal to the user device 110. The billing system 234 may also receive an unlocking signal comprising a report back that content has been unlocked at the user device. In this example, the user may order the movie via a user interface purchase menu of the user device. The user device may allow viewing, and may report back the unlocking signal by way of a phone connection or a broadband connection to the head end. The billing system 234 may bill the user account when the report back is received. As will be described further below, content may be stored in a user device but may not be accessible until it is played back. Some content may never be unlocked. When the content is unlocked such as played back, the user account is billed with the unlock signal that is communicated back to the billing system 234. Push content, wanted list content or other content not specifically requested may be unlocked in this manner.

A billing system 234 receives pricing and availability information from the content management system 221. A conditional access management system (CAMC) 236 receives callback information from the communication network 132. The conditional access management system 236 may be used to generate authorizations, pay-per-view billing data, and callback data from the billing system 234. Remote record requests may also be provided from the conditional access transaction system 238. A conditional access broadcast control system BCC 240 may be used to communicate a conditional access packet (CAP) from the information from the conditional access management system 236. The CAP may include a content title to be added to the wanted list at the user device. The CAP may also include the network location, channel and time that content will be broadcasted so that the user device may be tuned properly to record the content. The CAP may also include a content authorization signal so that the user device may allow the content to be viewed.

The billing system 234 may generate purchase data that is provided to the enterprise integration (EI) block 242. The enterprise integration block 242 may generate remote record requests to the conditional access transaction system 238. Content purchase requests and remote record requests may be generated through a web interface such as DIRECTV®.com in block 244. Access to the website 244 may be obtained in numerous ways including through a computer 246A, a mobile phone 246B, an interactive voice response system 246C and by an operator 246D. The computer 246A may be in communication with the web interface 244 through the internet, or the like. A website may prompt the user for ordering various content. Likewise, the mobile phone 246B may be in communication with the web interface. The mobile phone 246B may be a web-enabled device that allows access to the internet. An interactive voice recognition system 246C may provide the user prompts for ordering specific content. The user of the system may also contact the operator 246D who may interact with the web interface 244 on behalf of the user.

Various ordering information, such as ordering broadband video, pay-per-view, wanted list additions and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248 and the listing service 316 as will be described below. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also include a content delivery network identifier through which content is available for downloading. The program guide may also contain information for tuning, demodulating, demultiplexing, decrypting, depacketizing, or decoding selected programs.

Content files may also be provided from the content management system 221 to the content distribution system (CDS) 260.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (e.g., a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols, such as file transfer protocol (FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include files (e.g., movies, pre-recorded TV shows, games, software updates, asset files, pushed content, wanted list content, etc.) and/or live content, data, programs and information. Wireless delivery via the satellites 106, 108 offers the opportunity to deliver, for example, a number of titles (e.g., movies, pre-recorded TV shows, etc.) to virtually any number of customers with a single broadcast. As will be described below, the content may be carouseled to repeatedly provide content to customers on a push basis or as requested through a wanted list.

In contrast, Internet-based delivery via the CDN 280 may also support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110, 112 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A push scheduling system (PSS) 310 is used for scheduling Push and Carousel content to the various user devices. Push content is content that is not requested by a user but is delivered to a user device for eventual or possibly eventual use by the user. Push content is received and stored by a user device if the content is marked with a content reference identifier (CRID). Push content is non-linear which is broadcasted as a non-real-time content file via satellite, which is different than linear content broadcasted as a real-time program at a scheduled time. Carousel content is content that is requested by the user. Carousel content is received and stored by a user device if the content title is in a user's wanted list. Carousel content is also non-linear. The push scheduling system 310 may be in communication with a conditional access processor 312. The conditional access processor 312 may be used for requesting program-associated data such as future program-associated data, current program-associated data, or ending program-associated data. The program-associated data may be a variety of data files including duration, actors, directors, short description, the studios, or various other types of metadata. The program-associated data may be accessed from the content management system 221 or push scheduling system 310. The schedule PAD server 230 may receive the program-associated data and deliver the program-associated data to various devices.

The Subscription Manager (SM) 314 may be in communication with the traffic and scheduling system 228. The Subscription Manager may forward event codes and pricing which is provided to a DIRECTV® listing service module (DLS) 316 or simply listing service. The DLS 316 may also receive data from the content management system 221 such as metadata, thumbnails for programming content, categories and the like. Thumbnails may be images that show a content title, character or other visual identifier.

The program guide web service (PGWS) 318 may receive listings from the DIRECTV® listing service module 316 so that access to program guide information may be communicated via the internet. The program guide web service 318 may interface with the web interface and other service partners for providing programming data thereto. Details of this are further described below.

The push scheduling system 310 may also be in communication with a conditional access web service (CAWS) 322. The conditional access web service 322 may provide a web service for processing conditional access data. The Subscription Manager 314 may send content updates to the conditional access web service through the content management system.

A T20 handler (T20H) 340 receives data from the conditional access web service 322 and controls the communication to the CAMC 236.

The DIRECTV® listing service module 316 may also supply content material such as metadata in addition to channel data to the push scheduling system 310. The channel data may include, but is not limited to, channel start time, a channel stop time, a content channel bit rate, a transponder identifier, and a service channel identifier. CRID and scheduling data may be requested by the DLS from the push scheduler 316.

An external content data source 326, such as Tribune Media Services® (TMS) may provide data to the listing service module 316. Content identifiers that uniquely identify each content may be provided to the listing service module 316. The external source 326 may provide description data, actor data, poster data, studio data, pictures, trailers and the like to the content processing system 102.

A program guide extractor (PGE) 328 receives schedule data from the listing service and provides the schedule data to the content distribution system 260. The program guide extractor communicates data that is eventually used in the program guide system 248.

A DIRECTV® monitoring server (DMS) 330 is in communication with a user device 110. The user device 110 communicates callback information and data through the diagnostic monitoring server 330. The DMS 330 may also generate a signal corresponding to the success or failure of a transaction. The DMS 330 may be used to obtain data from the user devices corresponding to content within such user's wanted list. The DMS 330 may aggregate the data and provide the data to a cinema queue module 332.

The DMS 330, as described above, may receive the user's wanted list and the data associated therewith. The associated data may include the event times when a content title is added to the wanted list, when the content is received and stored, and when it is purchased and viewed. The DMS data may be aggregated over a large number of user wanted lists to determine a weighted ranking of content titles, a recording timeline and a carousel purchase rate. The weighted title ranking of a content title is the percentage of wanted lists that include the title. The recording timeline of a title is the percentage of wanted list recordings that occur on the first day, second day, third day, etc. The carousel purchase rate is the percentage of wanted list titles that get purchased.

The weighted ranking, the recording timelines and the purchase rate may all be determined in a cinema queue module 332. From these various data points, the content queues and priorities, as well as the life cycles, may be established. The content may then be communicated to the users from the prioritized content queues.

The cinema queue module (or cinema queue) 332 may be in communication with the DIRECTV® monitoring server (DMS) 330. The cinema queue 332 may be used to provide various data for prioritization of content. The data may be received from the DMS 330. The cinema queue 332 may provide a user device identifier, an external identifier such as a TMS identifier, a format, material identifiers, the position of each external identifier on each customer's wanted list, the number of customers with the external identifier on the cinema queue module 332 and how each customer is connected. The daily ranking score of the content titles may be calculated with the content data from the cinema queue module 332 so that the content may be organized for distribution through the carousel. The repetition rate and the frequency of the carousel may be adjusted based upon the data from the cinema queue module 332.

A prioritizer module (prioritizer) 350 may be in communication with various components including, but not limited to, the cinema queue 332, the program guide web service 318 and the push scheduling system 320. The prioritizer 350 may also be in communication with the advertising module (ads) 352. The advertising module 352 may be used to provide advertising scheduling to the system. The advertising module 352 will be further described below. The advertising module 352 may be linked with ad sales 224 described above.

The prioritizer 350 accepts content material metadata from the push scheduling system 310 and receives instructions about the content material from the cinema queue 332. Each content material that may be prioritized is provided with a content material identifier which is provided through the PSS 310 to the prioritizer 350.

The push scheduling system 310 supports the priorities for which the prioritizer may use to schedule content material.

Figure 3:
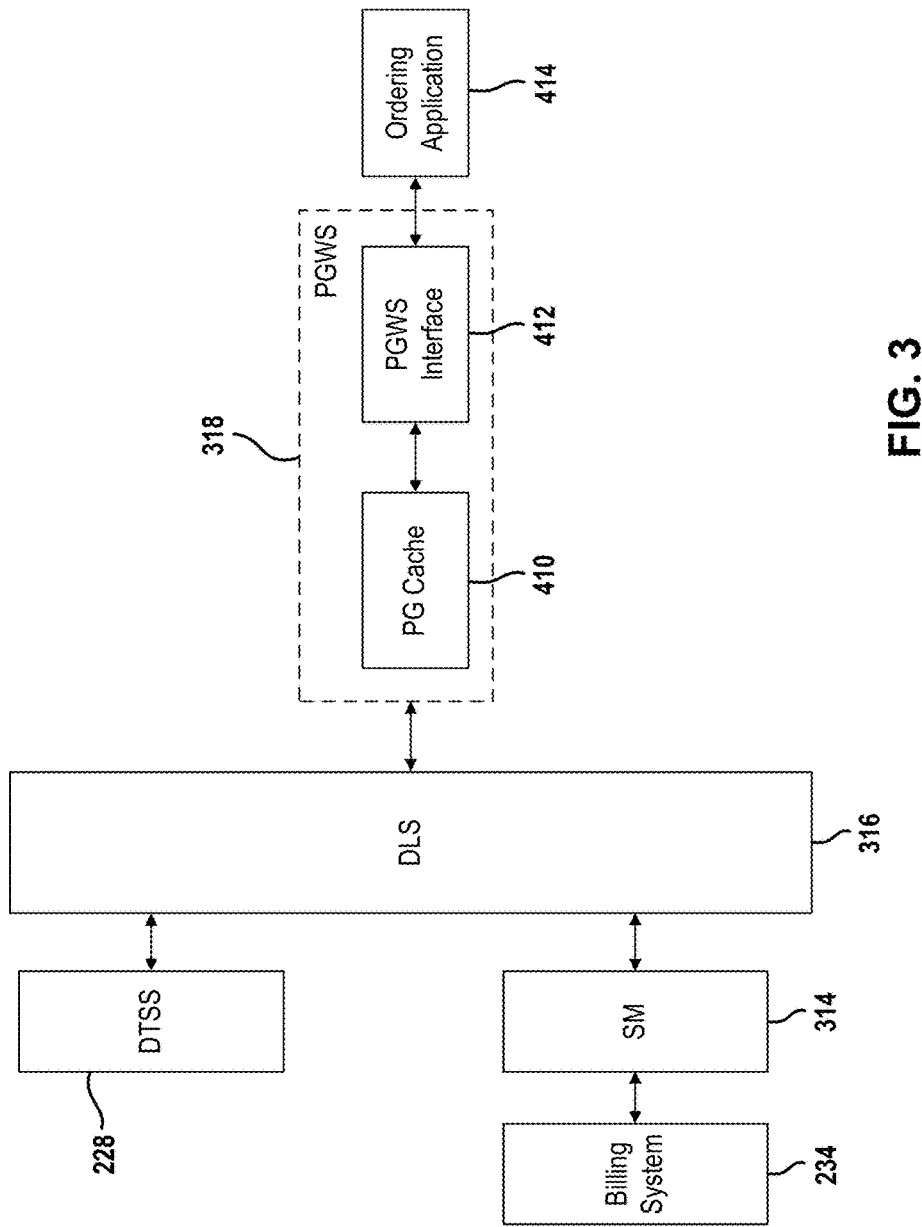
FIG. 3 is a simplified block diagrammatic view of a system for providing pricing and billing information for linear content.

Referring now to FIG. 3, a simplified block diagrammatic view of a system is illustrated. In this example, the DIRECTV® listing service 316 is in communication with the DIRECTV® traffic and scheduling system 228. The traffic and scheduling system 228 is used for communicating channels, program data, thumbnails for content, metadata and schedules to the listing service module 316. The program data provided from the traffic and scheduling system may include details such as time, actors, content type, rating, languages, a brief description, episode name, genre, format and other suitable data. The data is data about programming content and not the actual content itself. The listing service 316 may on a periodic basis pull the channel, program data and schedule data by request. That is, a request signal from the listing service may generate a response comprising new data. This may be performed, for example, every half-hour.

The listing service module 316 may also be in communication with the subscription manager module 314. The subscription manager module 314 publishes price data, impulse pay-per-view data, billing parameters and event codes. This data may be referred to as billing data separately or collectively. The expiration and event code provided by the subscription manager module 314 may be retrieved from the DIRECTV® billing system and, in particular, a secure transaction management system of the billing system 234 of FIG. 2. The DIRECTV® listing service module 316 may receive the billing data from the subscription manager 314. The subscription manager may be polled by the listing service module 316 for particular content and content data. The listing service module 316 combines and correlates the programming data received from the traffic and scheduling system 228 and the subscription manager 314. The combined data is formed in the DIRECTV® listing service module 316 and provided to the program guide web service 318. The program guide web service 318 may include a program guide cache 410 and a program guide web service interface 412. The combined data may be stored within the program guide cache 410. The program guide web service interface 412 may be in communication with an ordering application 414 such as a mobile application or a "dot coin" application. An ordering application 414 may be performed on the user devices 126 illustrated in FIG. 1. A "dot corn" interface may also be accessed through the mobile user device 112 illustrated above. Fixed user devices may also access the ordering application 414. One example is, a personal computer may access the ordering application by accessing a website.

In this example, the content and the programming data correspond to linear content. Linear content is content that is broadcasted at a particular time on a particular channel. Network programming is an example of linear content.

The data from the traffic and scheduling system 228 may correspond to first programming data about content that is or will be coming available. The first programming data does not include the actual program or program content itself.

Figure 4:
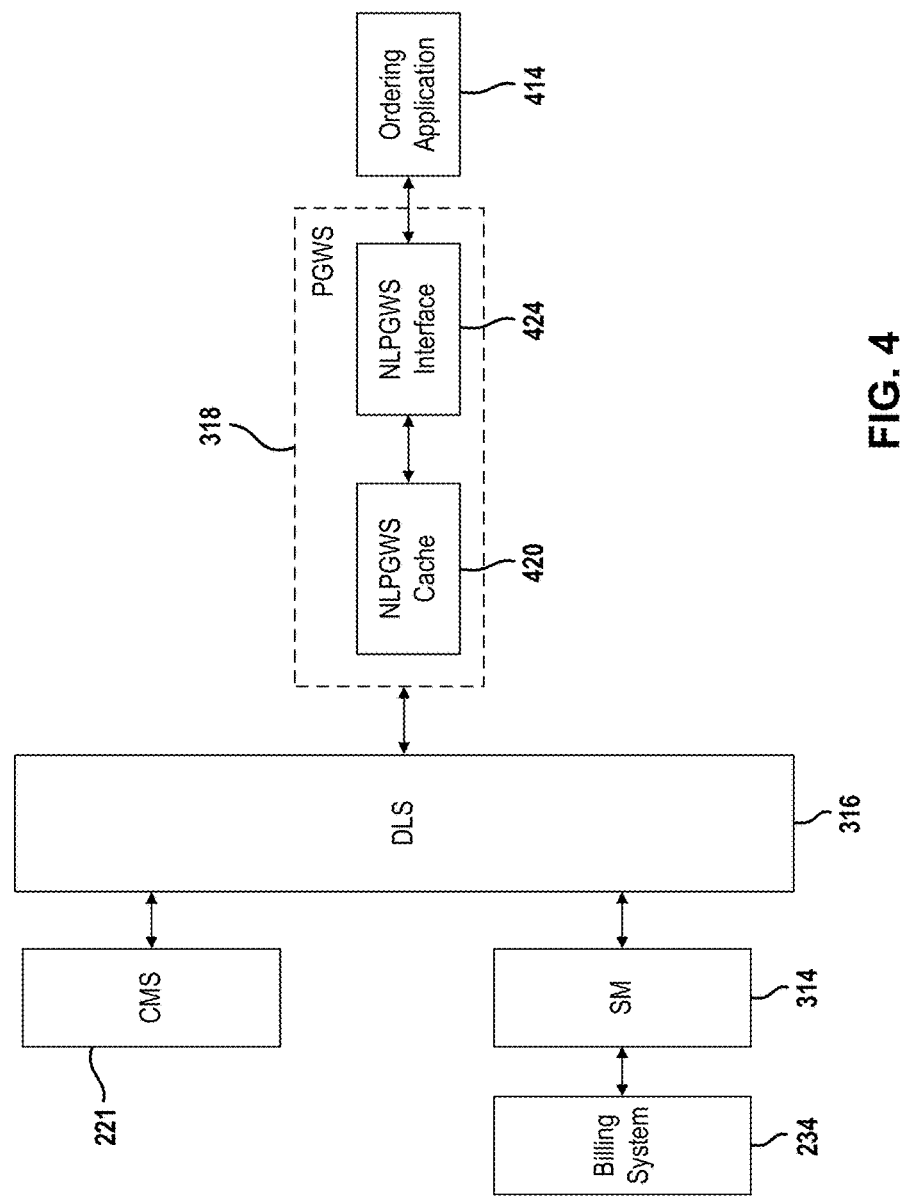
FIG. 4 is a simplified block diagrammatic view of a system for providing non-linear guide information for non-linear content.

Referring now to FIG. 4, a similar system to that of FIG. 3 is illustrated. In this example, the DIRECTV® traffic and scheduling system 228 has been replaced by the content management system 221 of FIG. 2. The system illustrated in FIG. 4 is suitable for non-linear data such as pay-per-view and on-demand content. In this example, the content management system 221 publishes asset metadata to the DIRECTV® listing service 316. Asset information is for non-linear content. The non-linear content may be content not broadcasted at any particular time. Video-on-demand content is one example of non-linear content. The billing system 234 and the subscription manager 314 operate in a similar manner to that described above with respect to FIG. 3.

In this example, the program guide web service 318 may also include a non-linear program guide web service cache 420 and a program guide web service interface 424. The DIRECTV® listing service 316 forms combined programming data from the programming data received from the content management system and the subscription manager 314 and stores them within a non-linear program guide web service (NLPGWS) cache 420. The non-linear program guide web service interface 424 may provide an interface to an ordering application 414 in a similar manner to that described above in FIG. 3 and thus the details will not be repeated. Details of the ordering application 414 and the interaction of the interface 424 with other modules will also be provided below.

It should be noted that the block diagrammatic views illustrated in FIGS. 3 and 4 may be combined as part of an overall system, such as the system illustrated in FIG. 2.

Figure 5A:
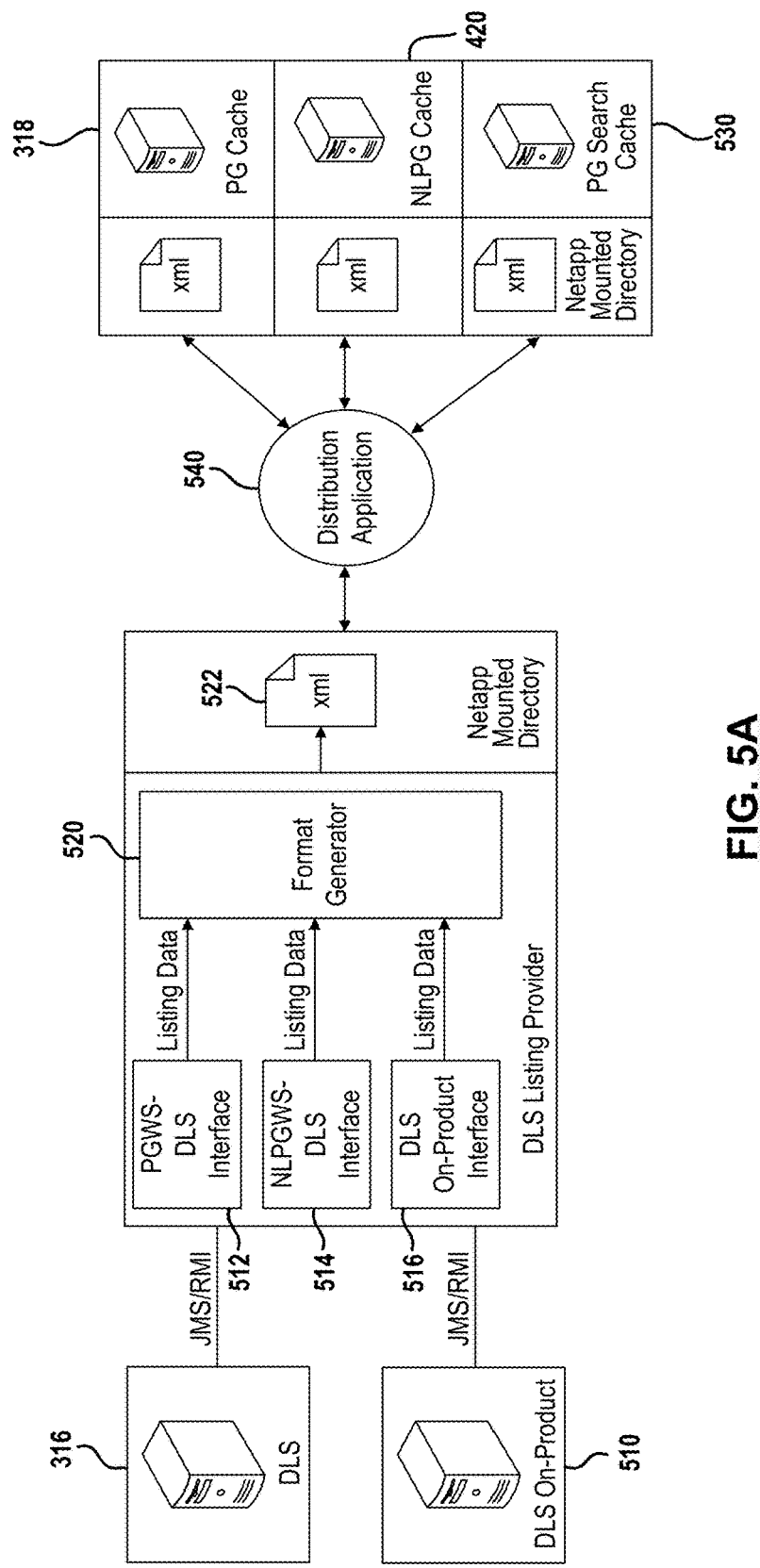
FIG. 5A is a simplified block diagrammatic view of a first embodiment of a program content distribution system.

Referring now to FIG. 5A, the DIRECTV® listing service (DLS) 316 may also have a counterpart listing service referred to as a DIRECTV® listing service on-product 510. The on-product module 510 may be used for providing various graphics data, posters and thumbnail data. A plurality of interfaces 512, 514 and 516 may provide an interface between the DLS 316 and the DLS on-product 510. The interfaces 512, 514 and 516 may use JAVA message service with remote method invocations to communicate data. A program guide web service-DLS interface 512 may provide an interface to format generator 520. The format generator 520 may change the content into an Extensible Markup Language (XML) or other format such as Java Script Object Notation (JSON). For the present example, XML is used. The non-linear program guide web service-DLS interface 514 may also provide an interface to the XML generator 520. Likewise, a DLS on-product interface 516 may provide an interface between the DLS on-product module 510 and the XML generator 520.

Listing data is provided through the interfaces 512-516 to the format generator 520. The format generator 520 may generate a formatted listing 522. The same document may be provided to various modules including the program guide cache module 318, the non-linear program guide cache module 420 and a program guide search cache 530. The DLS on-product module 510 may provide graphical data for the programming content and thus the program guide search cache 530 may be provided various graphical data or other content information.

The distribution application 540 may be used to distribute the XML document 522 containing the various information. In this manner, the distribution application can simultaneously communicate or replicate the XML data and communicate the XML data to the various cache modules.

Figure 5B:
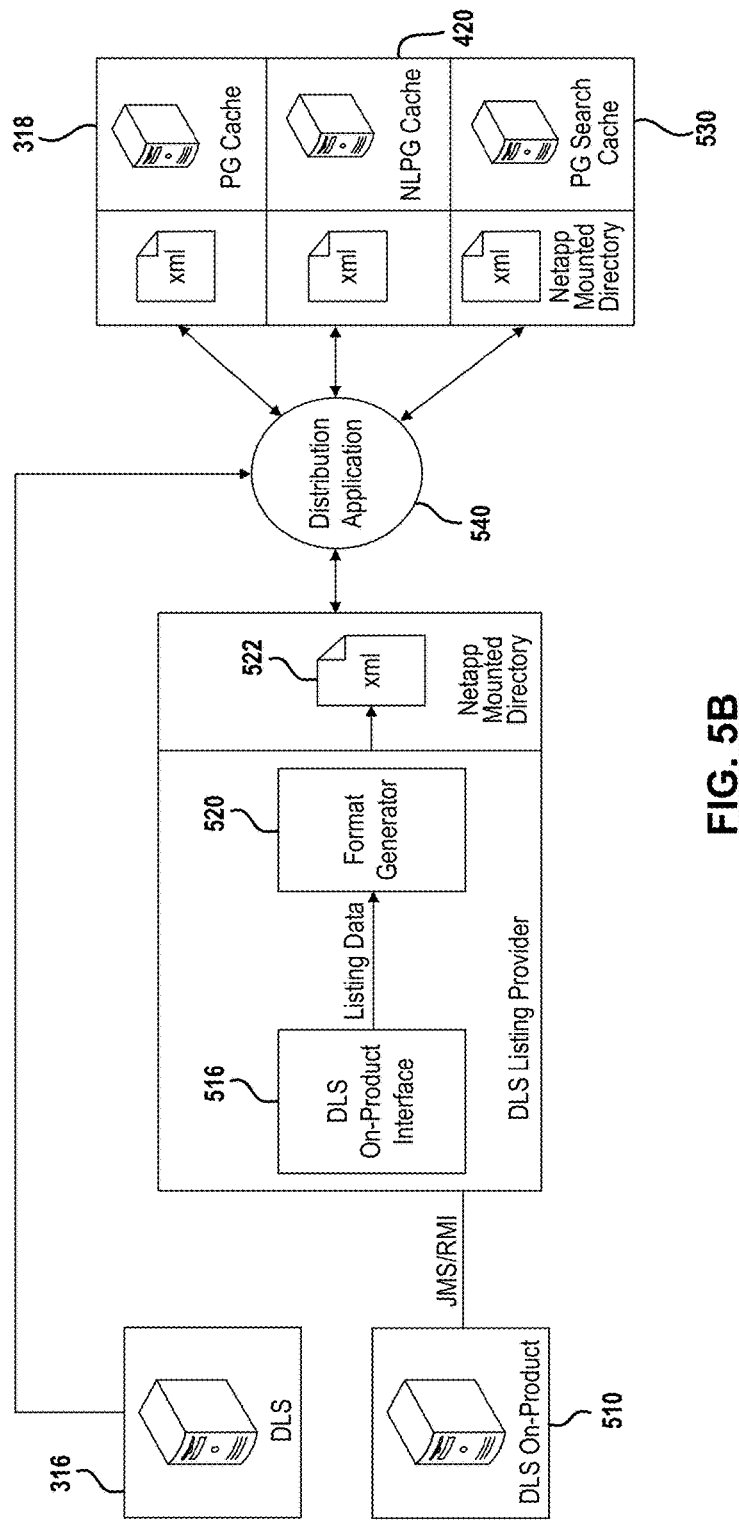
FIG. 5B is a simplified block diagrammatic view of a second embodiment of a program content distribution system.

Referring now to FIG. 5B, a system similar to that illustrated in FIG. 5A is set forth. In this example, the PGWS-DLS interface 512 has been eliminated and the NLPGWS-DLS interface 514 has been eliminated. The function of the format generator 520 is performed within the DLS 316. The output of the DLS 316 thus is coupled directly to the distribution application 540. The DLS on-product 510 is still in communication with the DLS on-product interface 516 which communicates with the format generator 520 which in turn communicates a formatted file 522 to the distribution application 540. As mentioned above, XML is only one type of formatted content that may be provided. Other types are also contemplated.

Figure 6:
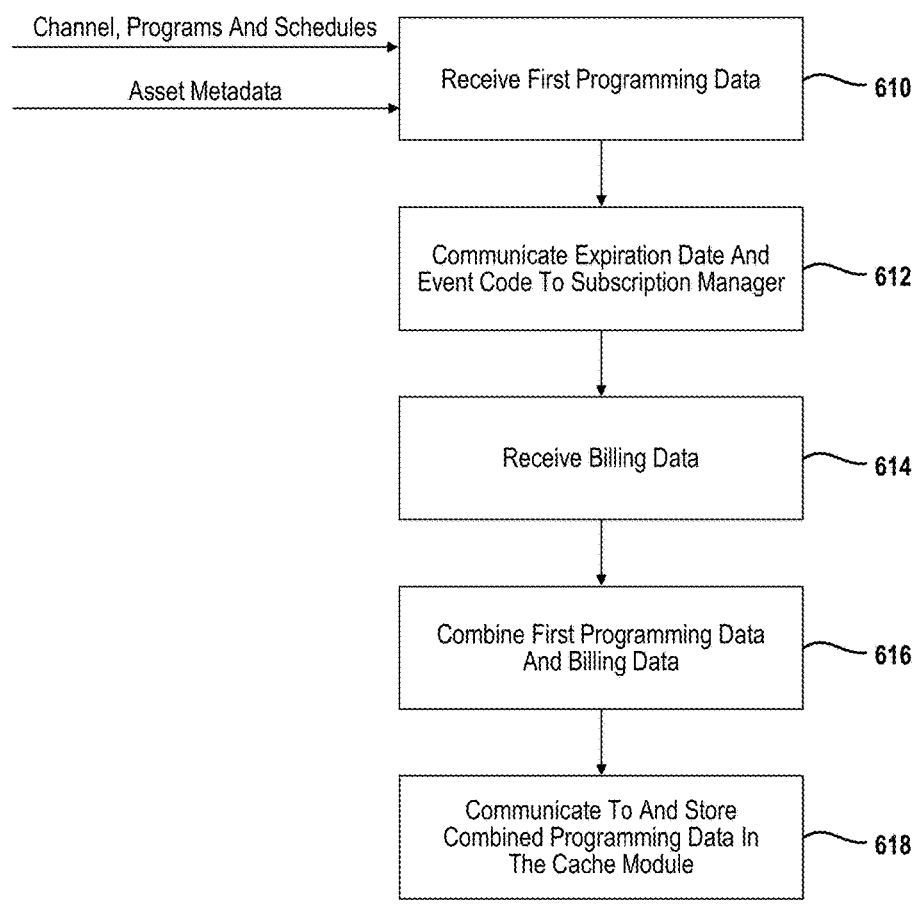
FIG. 6 is a flowchart of a method for obtaining programming content according to the present disclosure.

Referring now to FIG. 6, a method corresponding to the operation of FIGS. 4-6 is set forth. In this example, first programming data is received at the listing service in step 610. As mentioned above, various types of programming data may be communicated to the listing service module 316 (above). For example, channel data, program data, schedule data, thumbnail images and the like may be provided for linear content. For non-linear content, metadata may correspond to the first programming data. In either case, thumbnail images for the content may be provided. Likewise, other data such as program details, cast and crew details, start times of multiple programs and parental ratings may also be provided.

In step 612, an expiration date, event code, impulse pay-per-view data may be provided to the subscription manager. In step 614, the billing data from step 612 may be provided to the listing service module. In step 616, the first programming data from step 610 and the billing data from step 614 may be combined to form combined programming data. In step 618, the combined programming data may be communicated and stored within a cache module for access by an external device. The external device may be one of a number of types of user devices as described above. The external device may be a device that may or may not have the capability for video watching. Rather, the device may be able to access the ordering application 414 illustrated in FIGS. 3 and 4. It should be noted that the programming may be communicated to the cache module in a manner set forth above in FIG. 5. That is, an XML document may be communicated by a distribution application to various cache modules such as the program guide cache 318, the non-linear program guide cache 420, and the program guide search cache 530 as described above.

Figure 7:
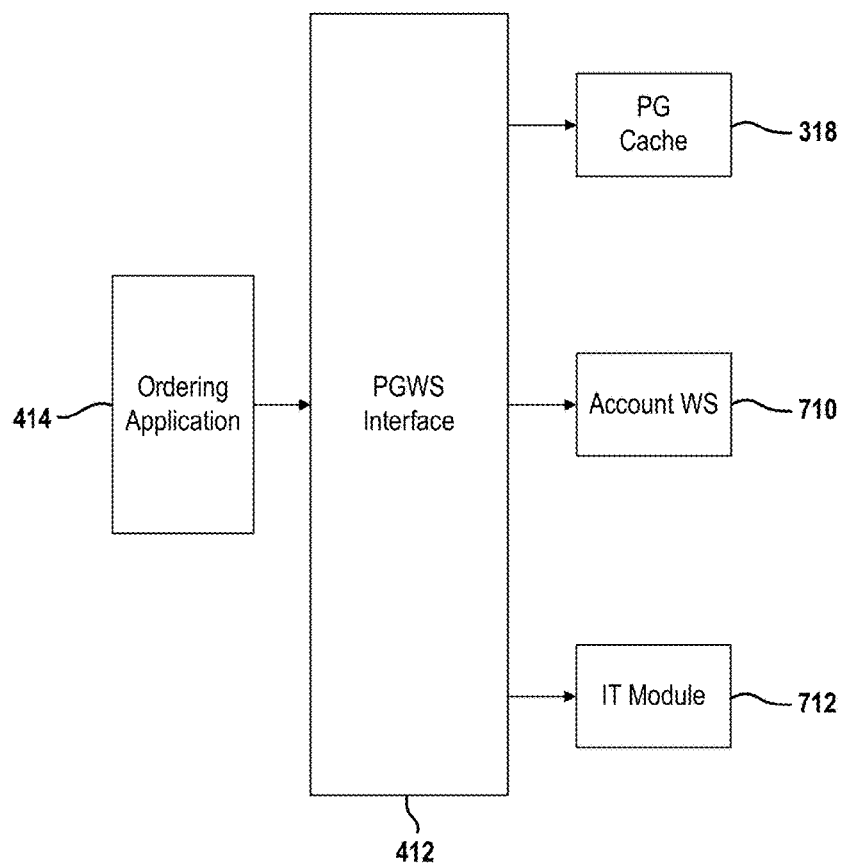
FIG. 7 is a simplified block diagrammatic view for ordering non-linear content.

Referring now to FIG. 7, the ordering application 414 may be in communication with the program guide web service interface 412. The interface 412 may provide a connection point between the program guide cache 318, an account web service 710 and customer product information technology (IT module) service 712. In this example, order-ahead pay-per-view may be requested to be ordered by the ordering application 414. The ordering application 414 may provide a channel identifier and a start time as well as other identifying information for the particular user account. The channel identifier and the start time may look up the billing parameters from the program guide cache 318 corresponding to the channel identifier and start time. The user identifier may be used to identify user devices associated with the account and obtain subscription data which is ultimately used to reduce the amount of combined data communicated to the requesting user device. The account web service 710 may provide such data. The data ultimately provided to the order device may be a subset of the combined data available. The subset is less than all the combined data available and may correspond to the content available to the user based on the level of service or subscription. Subscription may refer to a level of service.

The interface 412 may also be in communication with the modified customer product module 712. This may be referred to as information technology. The information technology department or group may receive an event code and provide the event code through the system illustrated in FIG. 2. The event code may be provided and ultimately be used to generate a conditional access packet (CAP) to the set top box or user device onto which the particular content selection may be recorded. The push scheduling system may also be used to push the content to the set top box so that the content may be stored within a digital video recording of the set top box.

For a linear system, the schedule and channel identifiers as well as the content identifier may be provided to the set top box in the conditional access packet (CAP). The conditional access packet provides instructions for the set top box to tune to the particular channel at a particular time and record the particular content according to the instructions in the conditional access packet (CAP).

Figure 8:
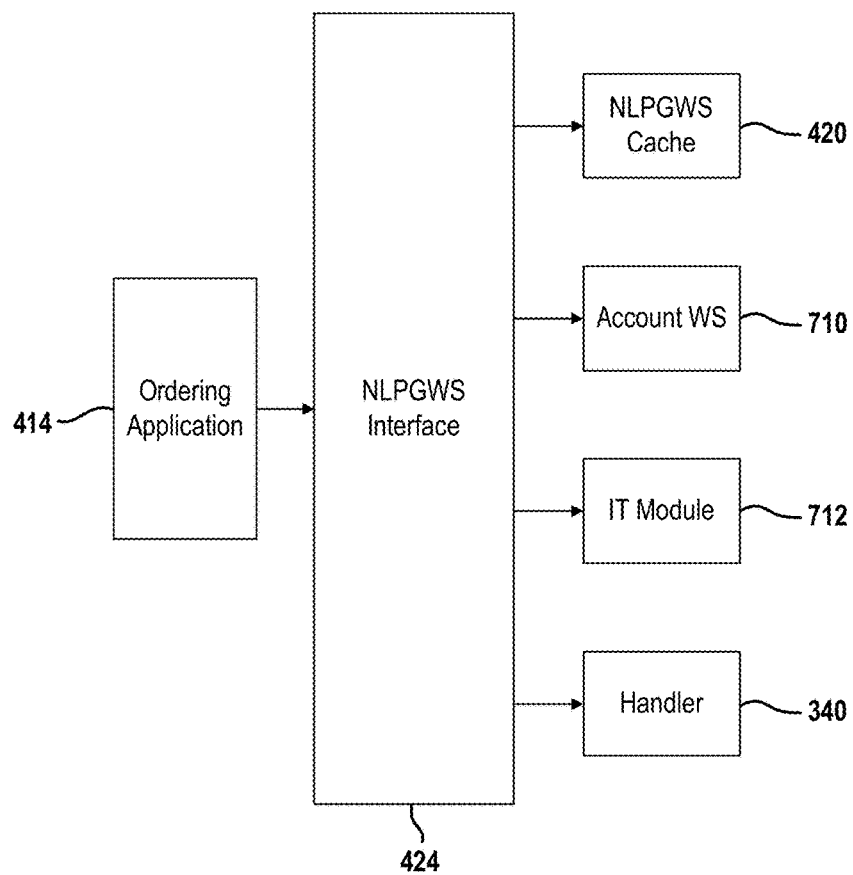
FIG. 8 is a simplified block diagrammatic view of a system for ordering non-linear content.

Referring now to FIG. 8, a system similar to that illustrated in FIG. 7 is set forth. In this example, the non-linear program guide interface 424 is in communication with the non-linear program guide cache 420, the account web service 710 and the IT module 712. In this example, the schedule which has billing parameters from the program guide cache may use the metadata and event code for the particular content to be recorded. A content delivery network may be identified for requesting the particular content. The conditional access web service handler 340 may be used to generate the conditional access or CAP.

Figure 9:
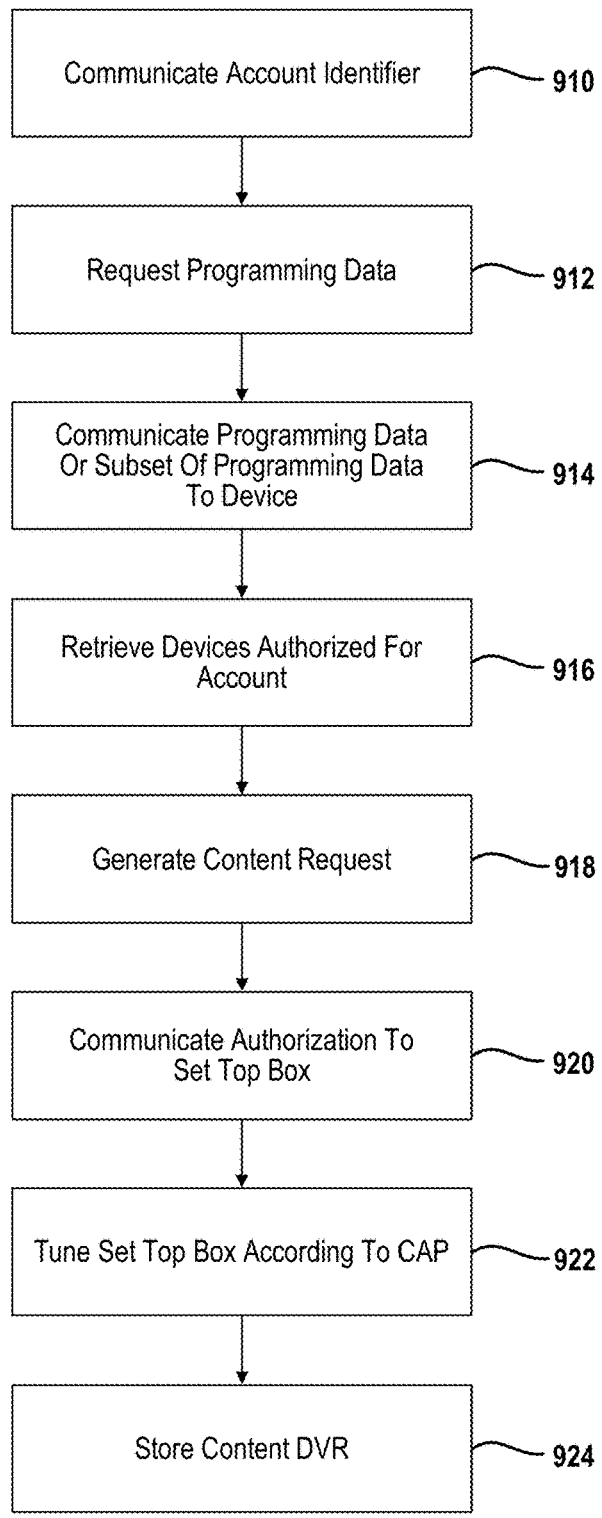
FIG. 9 is a flowchart of a method for communicating content to a user device.

Referring now to FIG. 9, a method for operating the system is illustrated in FIGS. 7 and 8 as set forth. In this example, the account identifier 710 may be communicated to an account web service 710 so that the particular account may be billed for the requested content. The account identifier may be communicated in step 910 together with a request for programming data 912. The order of steps 910 and 912 may be reversed. In step 914, the device receives the programming data so that a program request may ultimately be generated. The programming data may be a subset of the combined data described above. Authorized devices for the account associated with the account identifier 912 may be retrieved in step 916. The subscriptions associated with the account may be identified. This step may be performed also at different times within the process. In step 918, a content request is generated at the device that receives the programming data. The content request may include different types of identifiers such as a channel identifier and a start time or an event code. The type of identifier may depend upon the type of content that is being requested.

In step 920, authorization may be provided by a conditional access web service or other conditional access system. A conditional access packet may be provided to a set top box determined in step 916

In step 922, the set top box may be tuned to a particular content delivery network or channel at a particular time depending upon the type of content requested.

In step 924, the content is stored within a DVR of the set top box upon receipt.

Figure 10:
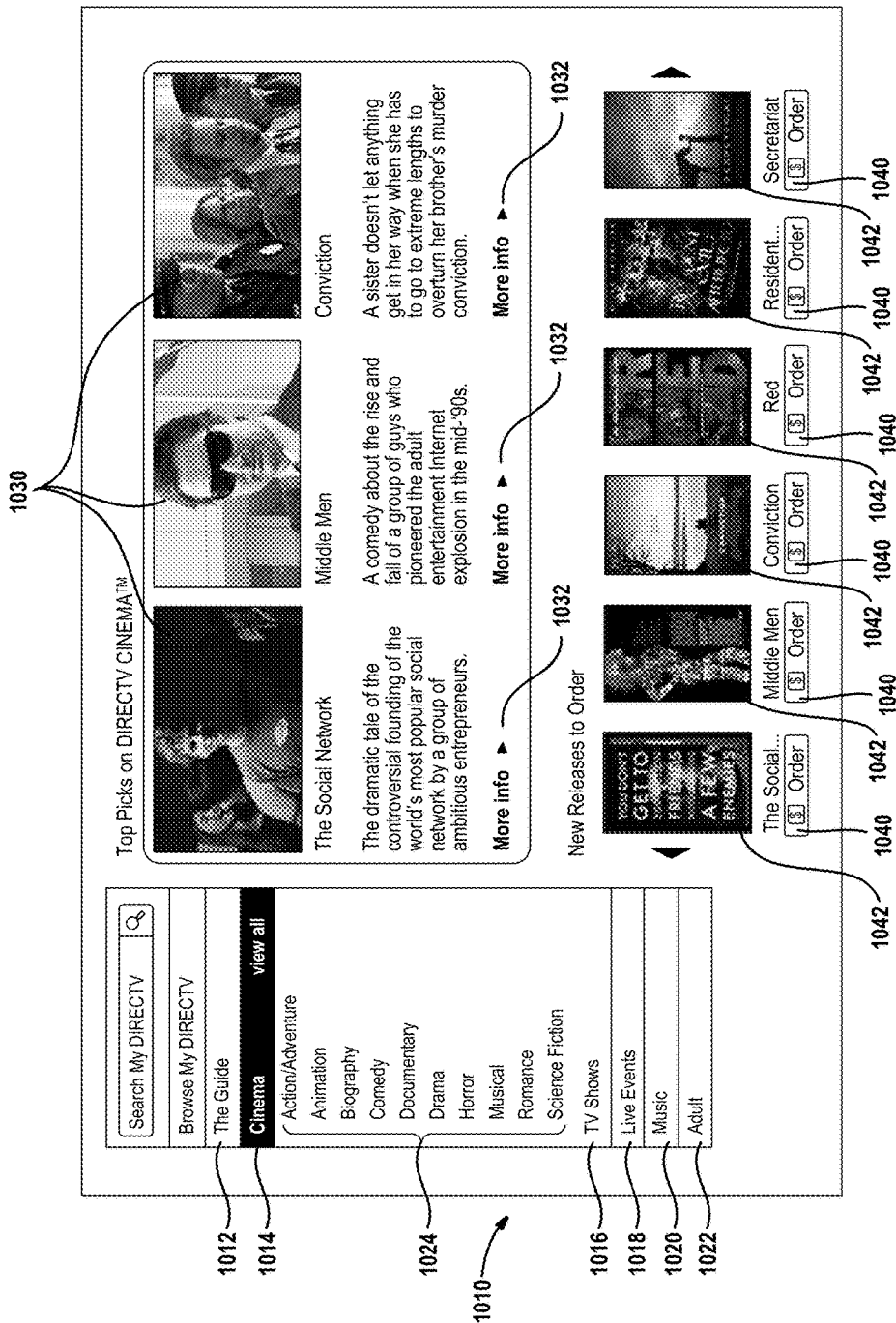
FIG. 10 is screen display of a program guide system according to the present disclosure.

Referring now to FIG. 10, a screen display 1010 is illustrated. The screen display provides an alternative to a traditional grid guide. A grid guide selection tab 1012 may be provided so that a grid guide may be viewed, if desired, by the user. However, various categories such as a cinema category 1014, a TV show category 1016, a live event category 1018, and a music category 1020 are illustrated. Further, an adult category 1022 may also be provided. Upon selecting one of the tabs 1014-1022, various other choices or categories may be provided. In this example, the cinema tab 1014 is selected and various categories 1024 may be provided. In this example, action adventure, animation, biography, comedy, documentary, drama, horror, musical, romance, and science-fiction are all provided.

When selecting the TV show tab 1016, various popular TV shows and their associated thumbnails may be displayed in a similar manner to the way the movie thumbnails 1030 are displayed in FIG. 10. Popular titles and links to data and other data about the particular TV show or movie may be provided. The thumbnails displayed may be restricted to those subscribed to and available for the particular user account.

The live-event tab may provide various options for particular live events. Live events may include various types of events including concerts and sporting events.

A detail tab 1032 may be selected for viewing further information regarding the thumbnail 1030. The detail tab may provide various data about the cost of the content, the run time, the program type, the date released, the rating, the language, the cast and crew, various start times and parental ratings. Ordering tabs 1040 may be displayed below thumbnails 1042. The ordering tab 1040 may be selected for further information and ordering information.

Figure 11:
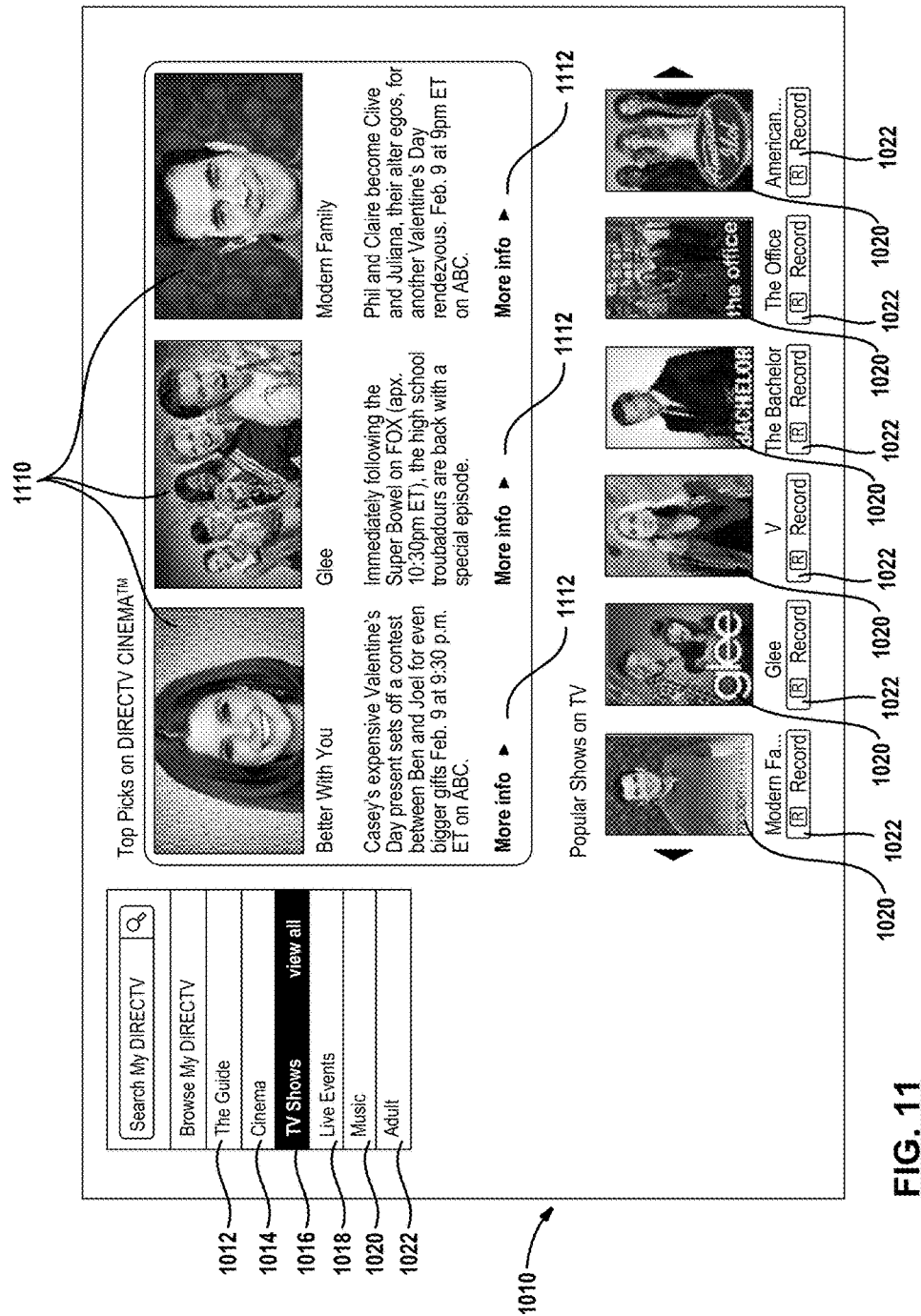
FIG. 11 is a screen display of a program guide system according to the present disclosure.

Referring now to FIG. 11, a similar configuration to that described above except for television programming is set forth. In this example, detailed thumbnails 1110 are illustrated. The detailed thumbnails 1110 provide additional information for linear content. Detail tabs 1112 may provide further information. Other thumbnails 1120 may also be provided for various content. The thumbnails 1120 may be simplified thumbnails compared to those illustrated above. Recording tabs 1122 may be provided directly below the thumbnails 1120 for providing an opportunity to record the particular content.

Figure 12:
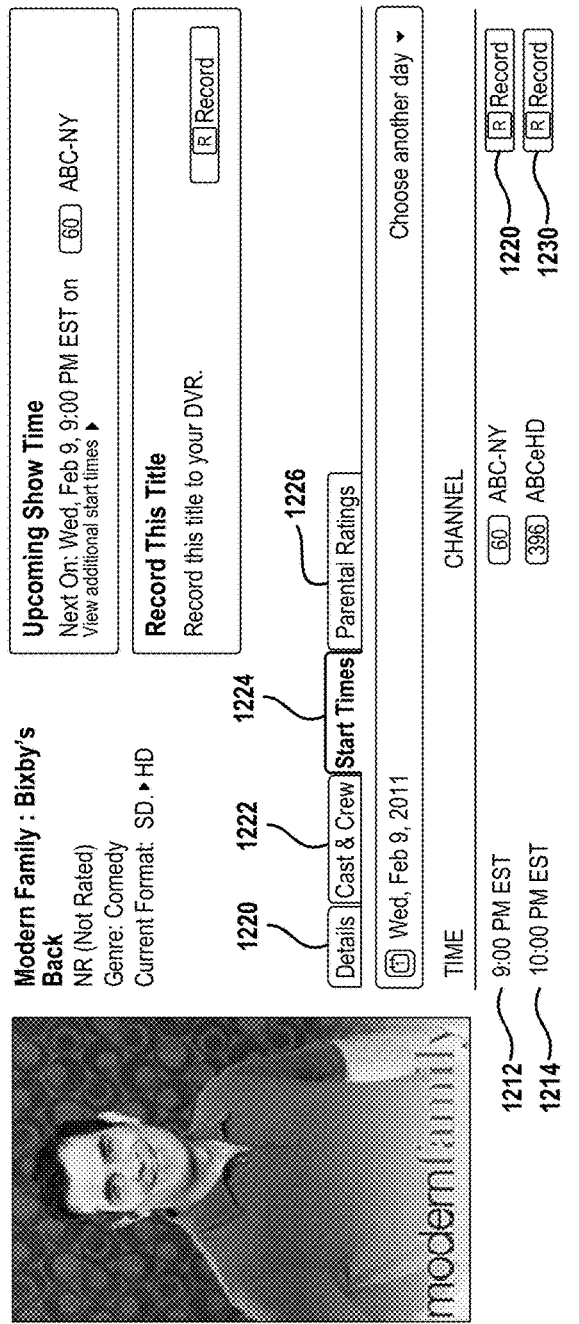
FIG. 12 is a screen display of an example of a selection for linear content.

Referring now to FIG. 12, when a thumbnail 1110 or 1120 is selected in FIG. 10 or 11, a detailed screen display 1210 is set forth. In this example two alternative channels 1212, 1214 are set forth. In this example, two different times on two different channels may be selected. Some content may only be available at a single time while other content may be available at more than two times on more than two channels.

Other tabs such as a detail tab 1220, a cast and crew tab 1222, a start time tab 1224, and a parental rating tab 1226 may all be provided for the various information thereunder.

It should be noted that the thumbnail-based displays illustrated in FIGS. 10 and 11 are provided for the content that is available. As mentioned above, the content illustrated in FIG. 12 is available at two different times. However, only one thumbnail would be provided for a particular content. That is, when a thumbnail of FIG. 10 or 11 is selected, the various times and channel availability are provided thereunder. In that manner, a simplified user interface is provided with a reduced amount of repetition. This allows the user to more easily select desired content.

Figure 13:
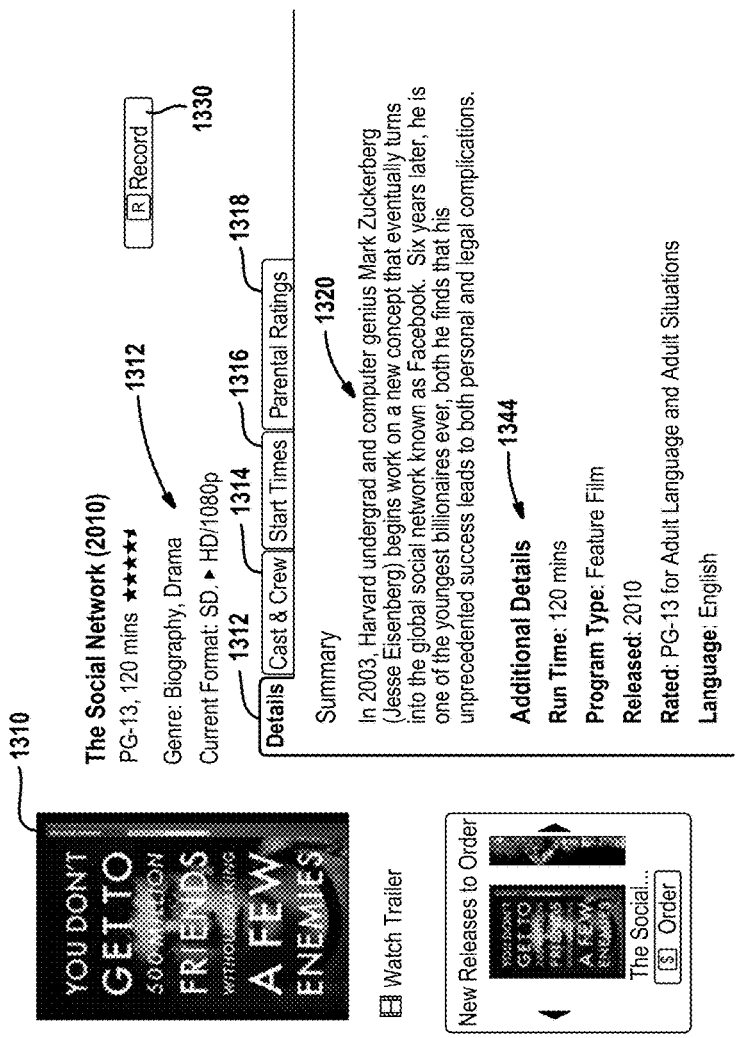
FIG. 13 is a screen display for content corresponding to non-linear content or video-on-demand content.

Referring now to FIG. 13, a screen display illustrating on-demand or non-linear content is set forth. In this example, an enlarged thumbnail 1310 is provided. In a similar manner to that described above in FIG. 12, a details tab 1312, a cast and crew tab 1314, a start time tab 1316, and parental ratings tab 1318 are all set forth. In this example, the screen display includes a summary 1320 that provides additional details for the content. A record button 1330 may be used for selecting the content for recording.

Other information may also be available on the screen display including a trailer selection button 1340 that may be used to watch the trailer on the user device.

The genres of the content may also be provided and a genre listing 1342. The genre listing 1342 may correspond to types of content selected to be displayed by the user. In this example, if a biography or drama is selected, this particular content may be displayed therein.

Additional details 1344 may also be provided which includes the run time, the program type, the release date, the rating and the language.

Figure 14:
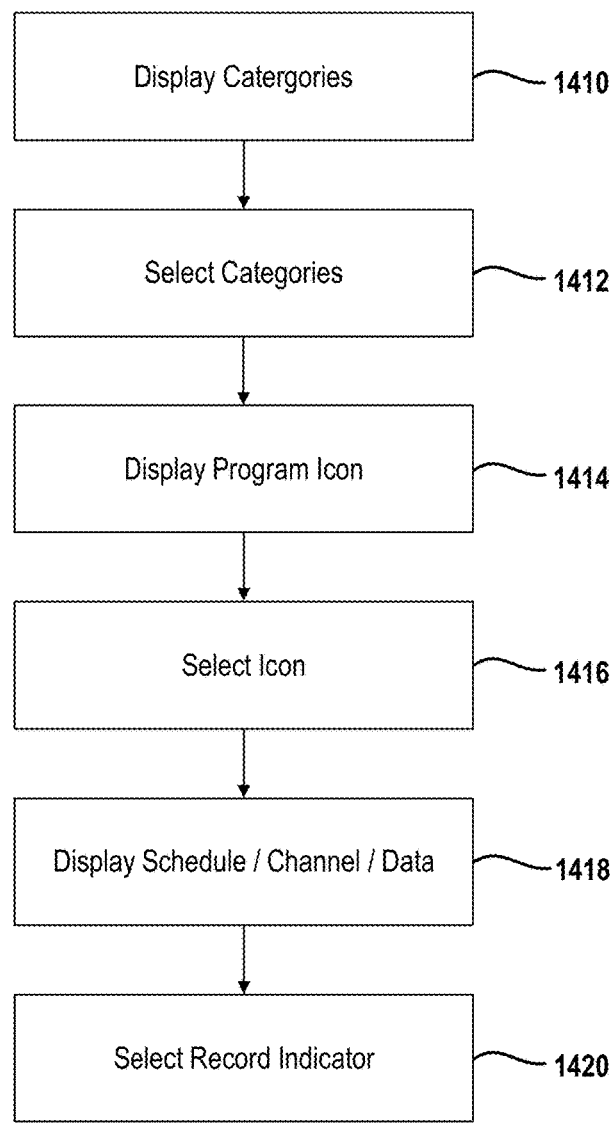
FIG. 14 is a flowchart of a method of ordering content or displaying program guide content according to the present disclosure.

Referring now to FIG. 14, a method for operating the screen display is illustrated in FIGS. 10-13 is set forth. In step 1410, various categories may be displayed. In FIGS. 10 and 11, these are displayed on the left-side of the screen. In step 1412, the various categories may be selected. In step 1414, icons may be displayed corresponding to the various categories. The icons may be thumbnails or the like corresponding to the particular programming available. The program's icons may be scrolled or otherwise manipulated so that all of the available contents may be displayed. Only icons corresponding to content may be displayed when account identifiers are used. In step 1416, an icon or thumbnail may be selected. By selecting the icon the user may display a channel or schedule in step 1418. Data may also be displayed by selecting the icon or thumbnail. As mentioned above, selecting the icon may correspond to the FIG. 12 display in which the data may correspond to various detail, including a plot, the cast and crew, start times, parental ratings, channel data and times. A selection may be made by selecting a record indicator. By selecting a record indicator such as those illustrated as step 1230 of FIG. 12, a content request may be provided. The content request signal may be communicated to one of the program guide interfaces depending upon the type of programming requested. The ordering process illustrated above may then be performed so that a set top box associated with the user account may be selected and the content stored therein.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:

receiving data for linear content comprising first metadata comprising a linear content type category, channel data, schedule data, program data, a content category and a first thumbnail image from a traffic and scheduling system and second metadata for a non-linear content type comprising a second thumbnail image and different than the linear content type from a content management system at a listing service module, said non-linear content being content available on demand at a request of a user and said linear content broadcasted at a predetermined time to a plurality of users;

receiving billing data from a first module for the content having the linear content type and the non-linear content type at the listing service module;

combining the first metadata and at least a first portion of the billing data in the listing service module to form first combined programming data and combining the second metadata and at least a second portion of the billing data to form second combined programming data;

communicating the first combined programming data for linear content to a program guide web service;

communicating the second combined programming data for non-linear content to a non-linear program guide web service;

distributing the first combined programming data to a linear cache from the program guide web service through a distribution application based on the linear content type;

distributing the second combined programming data to a non-linear cache from the non-linear program guide web service through the distribution application based on the non-linear content type, said non-linear cache separate from the linear cache and is separately accessible from a user device;

storing the first combined programming data in the linear cache accessible from a user device and storing the second combined programming data in the non-linear cache;

accessing the linear cache from the user device;

thereafter, displaying, on a display associated with the user device, a linear content display screen comprising the first thumbnail image and in response thereto communicating the first combined programming data from the linear cache;

accessing the non-linear cache from the user device; and thereafter, displaying, on a display associated with the user device, a non-linear content display screen comprising the second thumbnail image and in response thereto communicating the second combined programming data from the non-linear cache.

2. A method as recited in claim 1 wherein prior to distributing the first combined programming data to the user device, communicating account identifier data to an interface.

3. A method as recited in claim 2 wherein distributing the first combined programming data to the user device comprises communicating a subset of the first combined programming data less than the first combined programming data to the user device in response to the account identifier.

4. A method as recited in claim 2 wherein displaying the linear content on a screen display comprises displaying a first plurality of thumbnails.

5. A method as recited in claim 4 wherein displaying the linear content display screen comprises displaying the first plurality of thumbnails for the content within the first combined programming data grouped into categories.

6. A method as recited in claim 5 further comprising selecting a first thumbnail from the first plurality of thumbnails.

7. A method as recited in claim 6 wherein after selecting a first thumbnail, displaying programming data and recording data.

8. A method as recited in claim 7 further comprising generating a recording selection by selecting recording data.

9. A method as recited in claim 8 further comprising communicating the recording selection to an interface.

10. A method as recited in claim 9 wherein in response to the recording selection authorizing a receiving device to receive a selected content corresponding to the recording selection.

11. A method as recited in claim 10 wherein authorizing comprises communicating a conditional access packet to the user device for receiving the selected content.

12. A method as recited in claim 1 wherein displaying a non-linear content display screen comprises displaying a second plurality of thumbnails for the second combined programming data.

13. A method as recited in claim 1 wherein receiving data for content comprises receiving search data and further comprising communicating the search data to a third cache separate from the linear cache and the non-linear cache.

14. A system comprising:
a traffic and scheduling system generating first metadata comprising content having a linear content type, channel data, schedule data, program data, a content category and a first thumbnail image and communicating the first metadata to a program guide web service;
a contact management system generating second metadata for a non-linear content type comprising a second thumbnail image and different than the linear content type and communicating the second metadata to a non-linear program guide web service, said non-linear content being content available on demand at a request of a user and said linear content broadcasted at a predetermined time to a plurality of users;
a first module generating billing data corresponding to the content;
an electronic listing service module receiving the first metadata from the program guide web service, receiving the second metadata from the non-linear program guide web service, and receiving billing data from the non-linear program guide web service, said listing service module combining the first metadata and the billing data to form first combined programming data and combining the second metadata and at least a second portion of the billing data to form second combined programming data;
a distribution module receiving the first combined programming data from the program guide web service and receiving the second combined programming data from the non-linear program guide web service, and distributing the first combined programming data to a linear cache based on the linear content type, and distributing the second combined programming data to a non-linear cache based on the linear content type;
said non-linear cache and an electronic non-linear cache separately addressable from the linear cache in communication with the listing service module through the distribution module, said non-linear cache storing the first combined programming data in the linear cache accessible from a user device and the second combined programming data in the non-linear cache accessible from the user device.

15. A system as recited in claim 14 wherein the second metadata comprises a content category and a thumbnail image.

16. A system as recited in claim 14 wherein the first metadata comprises comprising channel data.

17. A system as recited in claim 14 wherein the first metadata comprises channel data and schedule data.

18. A system as recited in claim 14 wherein the first metadata comprises channel data, schedule data and program data.

19. A system as recited in claim 14 wherein the user device communicates an account identifier data to an interface.

20. A system as recited in claim 19 wherein the interface communicates a subset of combined data less than the first combined programming data to the user device in response to the account identifier.

21. A system as recited in claim 20 wherein the user device displays the subset of combined data on a screen display associated with the user device.

22. A system as recited in claim 21 wherein the user device displays a plurality of thumbnails for the subset of combined data.

23. A system as recited in claim 21 wherein the user device displays a plurality of thumbnails grouped into categories.

24. A system as recited in claim 22 wherein the user device selecting a first thumbnail from the plurality of thumbnails.

25. A system as recited in claim 24 wherein the user device displays first metadata and recording data.

26. A system as recited in claim 25 further comprising generating a recording selection by selecting recording data.

27. A system as recited in claim 26 wherein the user device communicates the recording selection to the interface.

28. A system as recited in claim 27 further comprising a conditional access system in communication with the interface, said conditional access system authorizing the user device to receive a selected content corresponding to the recording selection.

29. A system as recited in claim 28 wherein the conditional access system communicating a conditional access packet to the user device for receiving the selected content.

30. A system as recited in claim 23 further comprising a third cache separate from the linear cache and the non-linear cache with search data stored therein.

* * * * *